United States Patent
Kim et al.

(10) Patent No.: US 12,488,478 B2
(45) Date of Patent: Dec. 2, 2025

(54) APPARATUS AND METHOD FOR TRACKING AND ANALYZING THE TRAJECTORY OF BEES THROUGH LEARNING

(71) Applicant: FARMCONNECT CO., LTD., Daejeon-si (KR)

(72) Inventors: Mu Hyun Kim, Paju-si (KR); In Seok Jeong, Seoul (KR)

(73) Assignee: FARMCONNECT CO., LTD., Daejeon-si (KR)

( * ) Notice: Subject to any disclaimer, the term of this patent is extended or adjusted under 35 U.S.C. 154(b) by 172 days.

(21) Appl. No.: 18/342,456

(22) Filed: Sep. 1, 2023

(65) Prior Publication Data
US 2024/0242359 A1   Jul. 18, 2024

(30) Foreign Application Priority Data
Jan. 18, 2023   (KR) .................. 10-2023-0007640

(51) Int. Cl.
*G06T 7/246* (2017.01)
*A01K 47/06* (2006.01)
(Continued)

(52) U.S. Cl.
CPC .............. *G06T 7/248* (2017.01); *A01K 47/06* (2013.01); *G06N 3/08* (2013.01); *G06T 7/0002* (2013.01);
(Continued)

(58) Field of Classification Search
CPC ......... G06T 7/248; G06T 7/0002; G06T 7/90; G06T 2207/10016; G06T 2207/10024; G06T 2207/20036; G06T 2207/20081; G06T 2207/30241; G06T 2207/30242; G06T 2207/20084; G06T 7/246; G06T 3/4007; G06T 3/40; G06T 7/564; G06N 3/08; H04N 23/695; H04N 7/18;
(Continued)

(56) References Cited

U.S. PATENT DOCUMENTS 10,372,967 B1   8/2019   Vácha et al.
2005/0251347 A1*  11/2005  Perona ................. G06V 20/693
                                                    382/128
(Continued)

FOREIGN PATENT DOCUMENTS

CN   111272211 A      6/2020
CN   114847196   *  8/2022   ............. A01K 47/06
(Continued)

OTHER PUBLICATIONS

Steinbock, Lorenz, "Extended European Search Report" for EP Application No. 23180641.5, Dec. 1, 2023, EPO, Munich, Germany.
(Continued)

*Primary Examiner* — Keith D Bloomquist
(74) *Attorney, Agent, or Firm* — Bridgeway IP Law Group, PLLC; Jihun Kim

(57) ABSTRACT

An apparatus and a method for tracking and analyzing the trajectories of bees are proposed. Particularly, the apparatus and method utilize learning data obtained by training a deep learning model on the morphological structure, color, and other characteristics of bees to track and analyze the trajectories of bees.

17 Claims, 16 Drawing Sheets

(51) Int. Cl.
  *G06N 3/08* (2023.01)
  *G06T 7/00* (2017.01)
  *G06T 7/90* (2017.01)
  *H04N 23/695* (2023.01)

(52) U.S. Cl.
  CPC ............ *G06T 7/90* (2017.01); *H04N 23/695* (2023.01); *G06T 2207/10016* (2013.01); *G06T 2207/10024* (2013.01); *G06T 2207/20036* (2013.01); *G06T 2207/20081* (2013.01); *G06T 2207/30241* (2013.01); *G06T 2207/30242* (2013.01)

(58) Field of Classification Search
  CPC ...... G06V 10/25; G06V 10/62; G06V 10/764; G06V 40/23; G06V 40/10; A01K 47/06; A01K 29/00; A01K 67/30; G06Q 50/02
  See application file for complete search history.

(56) References Cited

U.S. PATENT DOCUMENTS

| | | | |
|---|---|---|---|
| 2015/0049919 A1* | 2/2015 | Humal | A01K 47/06 382/110 |
| 2016/0015007 A1 | 1/2016 | Sinanis | |
| 2016/0353715 A1* | 12/2016 | Temby | A01K 47/06 |
| 2020/0128796 A1* | 4/2020 | Catalano | G06F 16/2379 |
| 2021/0073528 A1* | 3/2021 | Lagerman | G06V 40/10 |
| 2021/0400925 A1* | 12/2021 | Harvey | A01K 47/06 |
| 2022/0211013 A1 | 7/2022 | Temby et al. | |

FOREIGN PATENT DOCUMENTS

| | | |
|---|---|---|
| CN | 114847196 B | 11/2022 |
| KR | 10-2016-0141224 A | 12/2016 |
| KR | 10-1963648 B1 | 4/2019 |
| KR | 20220048407 A | 4/2022 |
| WO | 2020055383 A1 | 3/2020 |

OTHER PUBLICATIONS

Averkiev, S. E., "Eurasian Search Report" for EA Application No. 202391783, Oct. 31, 2023, Eurasian Patent Office, Moscow, Russia.
Panko, V. Yu, "Conclusion on Patentability of the Invention for Application No. 202391783/31", Feb. 13, 2024, EAPO, Russia.
Wario, Fernando et al., "Automatic detection and decoding of honey bee waggle dances.", PloS one 12, No. 12, Dec. 13, 2017.

\* cited by examiner

APPARATUS AND METHOD FOR TRACKING AND ANALYZING THE TRAJECTORY OF BEES THROUGH LEARNING

CROSS-REFERENCE TO RELATED APPLICATION

This application is based on and claims priority to Korean Patent Application No. 10-2023-0007640 filed on Jan. 18, 2023, with the Korean Intellectual Property Office, the disclosure of which is incorporated herein by reference in its entirety.

TECHNICAL FIELD

The present invention relates to an apparatus and method for tracking and analyzing the trajectory of bees. Particularly, it involves an apparatus and method for tracking and analyzing the trajectory of bees by utilizing a deep learning model trained on the physical structure, color, and other characteristics of bees.

BACKGROUND

Honey bees are bees used to store and produce honey, while bumble bees are bees used for pollination, specifically for the purpose of gathering pollen through buzz pollination.

Buzz pollination refers to the behavior of vibrating their thoracic muscles to collect pollen on their hairy bodies, which transfers pollen to the stigma of flowers.

Therefore, bumble bees are commonly used for pollination of crops such as tomatoes, eggplants, peppers, and other plants of the Solanaceae family that do not produce honey. They are also widely used for cultivating crops such as peaches, plums, apples, apricots, strawberries, cantaloupes, pears, blueberries, raspberries, mangos, and more.

For example, in tomato cultivation, it is known that when bumble bees are introduced, about 10-20% of the worker bees collect pollen 5-12 times per day, visiting 50-220 flowers during each collection activity.

However, excessive pollination due to excess bees compared to the number of flowers can lead to deformities and poor fruit development. To control the pollination activity of bumble bees, hive entrances and exits are equipped separately, and their opening and closing are adjusted according to the time of day and bee activity.

As time passes after the beehive installation, the population of bumble bees decreases, and their movement slows down, indicating the need to replace the beehive. Additionally, when the temperature exceeds 30 degrees Celsius, more bees stay inside the hive to maintain a lower temperature for ventilation purposes, reducing their pollination activity. Once the temperature exceeds 33 degrees Celsius, the bees enter survival mode, eliminating larvae and ceasing pollination activity. To monitor such conditions, a bumble bee management technique has been proposed, which remotely monitors the status of bumble bees.

In South Korea, there are published patents such as Korean Patent Publication No. 10-2016-0141224, "Bumble Bee Management Device and Management System," published on Dec. 8, 2016, which discloses a technology that uses a sensor to detect the frequency of bumble bees entering and leaving through the hive entrance, providing information on the timing of bumble bee replacement. Another patent, Korean Patent No. 10-1963648, "Greenhouse Bumble Bee Management System and Method, Bumble Bee Box," published on Apr. 1, 2019, discloses a technology that uses multiple sensors to detect the direction and frequency of bumble bees entering and leaving the bumble bee box, enabling control of the opening and closing of the entrance of the bumble bee box.

However, the conventional technologies mentioned above require the installation of sensors in the beehive to detect the entry and leave of bumble bees, which can affect the bees' environment. Additionally, their effectiveness is limited to counting the number of bee individuals and does not provide information on the environmental changes or suitability of bee pollination activity by tracking bee trajectories or analyzing bumble bee's movements. These technologies also fail to provide the necessary information for beehive and greenhouse management.

In addition, many bumble bees are used to be sold in beehive units, but even newly purchased beehives may contain bees in poor health. In such cases, there is a need to assess the health of the bees and provide early notification to prevent missing the optimal timing for pollination. However, the aforementioned conventional technologies do not address the recognition of such issues or propose solutions.

DISCLOSURE OF INVENTION

Problems to be Solved by the Invention

To address the aforementioned issues, the present invention aims to provide an apparatus and method for tracking the trajectory of bees by comparing their movements captured near the beehive with training data, determining their entry and exit, and counting the number of bees.

Furthermore, the present invention aims to provide an apparatus and method for analyzing the amount of pollen collected by bees, the suitability of their pollination activities, and the health status of bees using captured videos.

Moreover, the present invention aims to provide an apparatus and method for determining the suitability of pollination activities of bees and deciding the replacement timing of beehives by analyzing the trajectory of bees and the condition of pollen in the captured videos.

Additionally, the present invention aims to provide an apparatus and a method that notify the presence of abnormal objects approaching the beehive based on the trained data.

Means for Solving the Problem

To achieve the above objectives, the apparatus and method for tracking and analyzing the trajectory of bees through learning in accordance with an embodiment of the present invention includes: a camera unit that captures the movement of bees near the entrance of the beehive; a storage unit that stores trained data obtained by training the physical characteristics of bees using a deep learning model; and a control unit that tracks the trajectory of bees using the captured video from the camera unit and the stored trained data.

Furthermore, the trained data further includes data on the morphological characteristics of pollen, and the control unit analyzes the quantity of pollen using the pollen images captured in the video and the morphological characteristics of pollen included in the trained data.

Additionally, the control unit defines multiple virtual areas of different sizes centered around the beehive entrance and defines bee boxes around bees when bees are identified in the captured video.

Moreover, the control unit identifies the entry and exit of bees by recording or tracking the order in which the bee boxes overlap with the virtual areas.

The virtual areas include Area 1 which occupies a certain area around the beehive entrance, and Area 2 that includes the Area 1 and occupies a larger area than the Area 1.

Furthermore, the control unit defines pollen boxes around identified pollen in the captured video.

The pollen boxes are defined within the bee boxes.

Furthermore, the control unit calculates the relative distance change from the center point of the entrance to the bee box and the frequency of appearance of the bee box within the virtual area.

Further, the control unit distinguishes bees entering the beehive from bees leaving the beehive by comparing the trajectory of bees captured within the virtual areas with the trajectory of bees included in the trained data.

Additionally, the control unit distinguishes normal bees from abnormal bees by comparing the trajectories of bees captured within the virtual areas with those of bees included in the trained data.

The control unit determines the replacement time of the beehive by calculating the ratio or number of normal bees to abnormal bees.

Furthermore, the control unit accumulates the number of bees captured within the virtual areas on a frame-by-frame basis.

The control unit calculates the trajectory of bees around the beehive entrance based on the X-axis and Y-axis distances from the entrance.

Moreover, the control unit determines bees are leaving the beehive if the overlap between the bee box and the virtual areas occurs from Area 1 to Area 2 during a specified period, and determines bees are entering the beehive if the overlap occurs from Area 2 to Area 1.

The apparatus further includes a display unit, and the control unit counts the number of bees entering or leaving the beehive at the entrance and displays it on the display unit.

The control unit may display the quantity of pollen on the display unit.

The control unit may display the color of pollen on the display unit.

The trained data further includes data on the morphological characteristics of abnormal objects, and the control unit analyzes the presence of abnormal objects using the captured video of abnormal objects and the morphological characteristics of abnormal objects included in the trained data.

The control unit predicts the position of bees using interpolation in areas of the captured video where bees are not identified.

The control unit forms contours on the boundaries of the distribution area of pollen by image preprocessing to find the distribution area of pollen within the pollen box and calculates the color and concentration of the pollen in the internal area of the contours.

Effects of the Invention

According to the present invention, an apparatus and a method are provided that track the trajectory of bees by comparing the movement of bees captured near the beehive with training data, determining the entry and exit of bees, and counting the number of bees.

Furthermore, according to the present invention, an apparatus and a method are provided that analyzes the amount of pollen collected by bees, the suitability of their pollination activities, and the health status of bees using captured videos.

Moreover, according to the present invention, an apparatus and a method are provided that determine the suitability of pollination activities of bees and decide the replacement timing of beehives by analyzing the trajectory of bees and the condition of pollen in the captured videos.

Additionally, according to the present invention, an apparatus and a method are provided that notify the presence of abnormal objects approaching the beehive based on the trained data.

DESCRIPTION OF THE INVENTION

Figure 1:
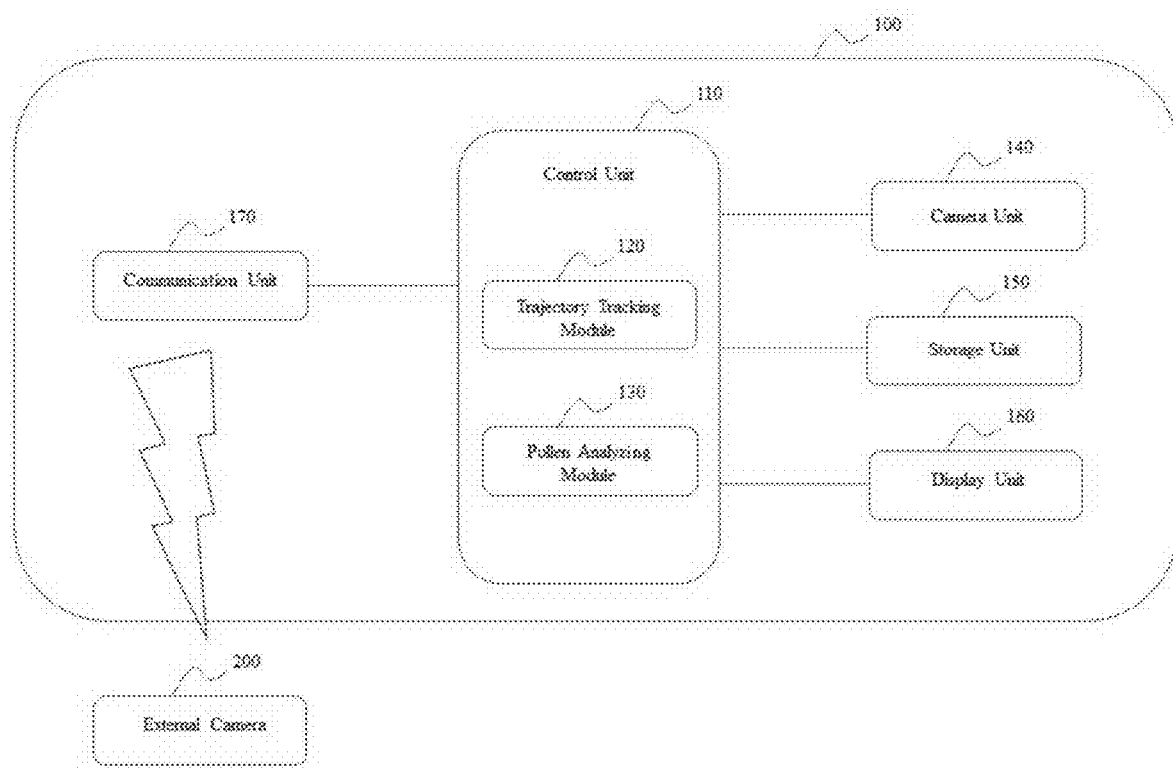
FIG. 1 is a schematic diagram illustrating the configuration of an apparatus for tracking and analyzing the trajectory of bees according to some embodiment of the present invention.

The advantages, features, and methods for achieving them in the present invention will be clearly understood by referring to the detailed explanation of the embodiments provided with the accompanying drawings. However, it should be understood that the present invention is not limited to the embodiments disclosed herein, as it can be implemented in various other forms. The disclosed embodiments are provided to fully disclose the invention to those skilled in the technical field to which the invention belongs to understand the scope of the invention. The same reference numerals throughout the specification denote the same components.

The terms used in this specification are merely used to describe specific embodiments and are not intended to limit the invention. Unless otherwise clear from the context, plural expressions encompass singular expressions. In this specification, terms such as "including" or "having" are intended to indicate the presence of the features, numbers, steps, operations, components, or sub-components as listed in this specification rather than excluding the presence or possibility of one or more other features, numbers, steps, operations, components, or sub-components, or their combinations.

In this specification, terms such as "part," "module," "device," "terminal," "server," or "system" are intended to refer to hardware, software or a combination of both. For example, the hardware may be a data processing apparatus, including a CPU or other processor. Additionally, the software operated by the hardware may refer to running processes, objects, executables, threads of execution, programs, or similar entities.

Hereinafter, a detailed description of a preferred embodiment of the present invention will be provided with reference to the accompanying drawings.

FIG. 1 is a schematic diagram illustrating the configuration of an apparatus for tracking and analyzing the trajectory of bees according to some embodiment of the present invention.

The apparatus (100) is configured to include a control unit (110) that tracks the trajectory of bees and analyzes the collected pollen amount through a trajectory tracking module (120) and a pollen analyzing module (130), and a storage unit (150) that stores the trained data obtained by training various information about bees and pollen using a deep learning model.

It may further include a camera unit (140) for capturing the movement of bees near the beehive, a display unit (160) for displaying the captured videos, and a communication unit (170) for performing wired or wireless communication with external devices.

If an external camera (200) is used instead of the built-in camera unit (140), the apparatus (100) can perform data transmission with the external camera (200) through the communication unit (170). An external display device (not shown) can be used instead of the built-in display unit (160) of the apparatus (100), or it can be used in conjunction with the built-in display unit (160).

The apparatus of the present invention learns (or trains) the characteristics of bumble bees, such as body structure or color distribution, using a deep learning model, and stores the trained data in the storage unit (150). It compares the streaming video data received from the camera unit (140) and then stored in the storage unit (150) with the trained data pre-stored in the storage unit (150) on a frame-by-frame basis to detect bumble bees in the video, track their movement paths, identify pollen, and analyze the amount of pollen.

FIGS. 2 to 15 are screen examples of the apparatus for track tracking and analyzing the trajectory of bees according to some embodiment of the present invention.

Figure 2:
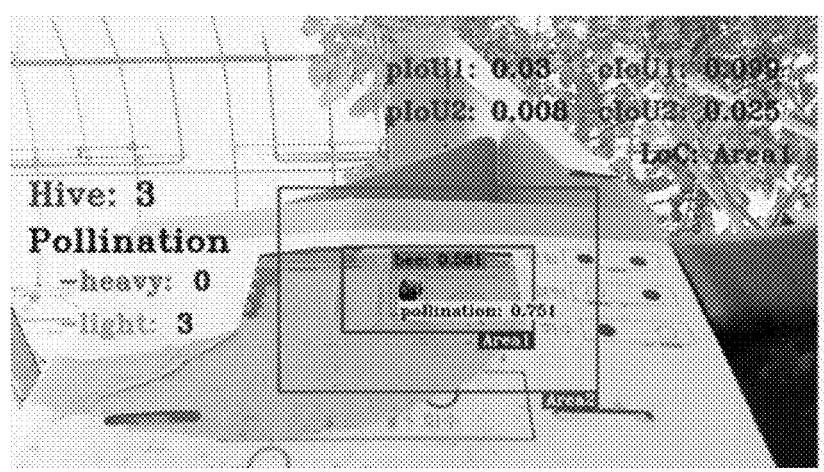
FIGS. 2 to 15 are screenshots obtained by the apparatus for track tracking and analyzing the trajectory of bees according to some embodiment of the present invention.

The display screen provided by the apparatus of the present invention may have a configuration shown in FIG. 2.

In general, the recognition of bumble bees is performed by calculating the intersection over union (IoU) between a plurality of virtual square boxes (referred to as "gates") near the entrance of the beehive and square boxes for bees (referred to as "bee boxes") automatically drawn when bees are recognized.

In FIG. 2, the gates are defined to distinguish Area 1 (i.e., inside the red gate), Area 2 (i.e., inside the blue gate), and Area 3 (i.e., outside the blue gate), and bee boxes (i.e., green boxes) are defined around the bees.

The apparatus of the present invention records or tracks the occurrence order of intersections between the gate's interior area and the bee box to distinguish whether the bee is entering or leaving the beehive.

For example, if the movement of the bee box (or the intersection between the bee box and the gate) is recorded in the order of Area 1→Area 2→Area 3, it indicates that the bee is leaving the beehive. If it is recorded in the order of Area 3→Area 2→Area 1, it indicates that the bee is entering the beehive. If the bee stays in Area 1 for a while and then disappears, it is considered to have entered the beehive.

In FIG. 2, "Hive" indicates the number of bees inside the beehive, which is calculated by counting the number of entries and exits of bees.

"Pollination" represents the amount of pollen collected by bees, where "heavy" indicates abundant pollen collection and "light" indicates relatively insufficient pollen collection.

"LoC" indicates in which area the bee (or bee box) is located.

On the other hand, the definition of IoU (Intersection over Union), which is a metric used to evaluate the accuracy of object detection in the present invention, is as follows.

IoU=Intersection of the gate area and the bee box area/Union of the gate area and the bee box area $$IoU = \frac{\text{Intersection of the gate area and the bee box area}}{\text{Union of the gate area and the bee box area}}$$

The calculated intersection over union (IoU) values, 'pIoU1,' 'pIoU2,' 'cIoU1,' and 'cIoU2', are displayed on the upper right of the screen of FIG. 2. The prefixes 'p' and 'c' represent the past and current values, respectively.

'pIoU1' represents the value measured in the previous frame for Area 1 (i.e., inside the red gate), 'pIoU2' represents the value measured in the previous frame for Area 2 (i.e., inside the blue gate), 'cIoU1' represents the value measured in the current frame for Area 1, and 'cIoU2' represents the value measured in the current frame for Area 2, respectively.

In addition to IoU, other values such as 'Hive' and 'Pollination' are also updated for each frame of the video.

Recognition of bees and pollen is performed by comparing the captured video with the stored trained data. The probability of an object in the video, such as a bee or pollen, being identified as a bee or pollen can be represented numerically near the bee box or pollen box. For example, if the number '0.99' is displayed next to the bee box, it means that the object has a 99% probability of being identified (or predicted) as a 'bee.'

The pollen box is generated within the bee box, and the numerical value displayed next to the pollen box represents the probability of the overlapping pollen image being predicted (or identified) as pollen.

To find the predicted pollen region, image preprocessing is performed to draw contours on the corresponding area. The color and concentration (i.e., the proportion of pixels occupied by a specific color) within the contour are calculated.

If there is a certain correlation between the distribution of pollen on the bee's body and the bee's pollen foraging level, a criterion for classifying the bee's pollen foraging level can be established based on the shape and the curvature radius of the contour. For example, if the contour is elliptical or the pollen distribution area is relatively large, it indicates that the bee's pollen foraging is insufficient or inadequate, while if the pollen distribution area is small and closer to a circle, it indicates that the bee's pollen foraging is vigorous and active.

Figure 3:
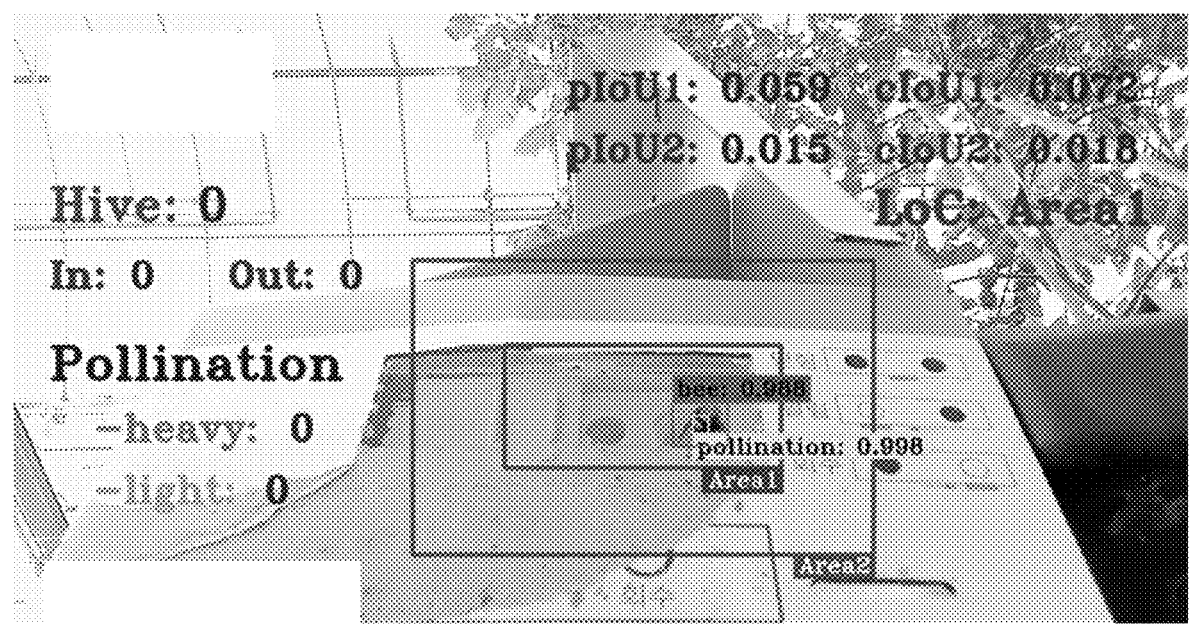
Figure 4:
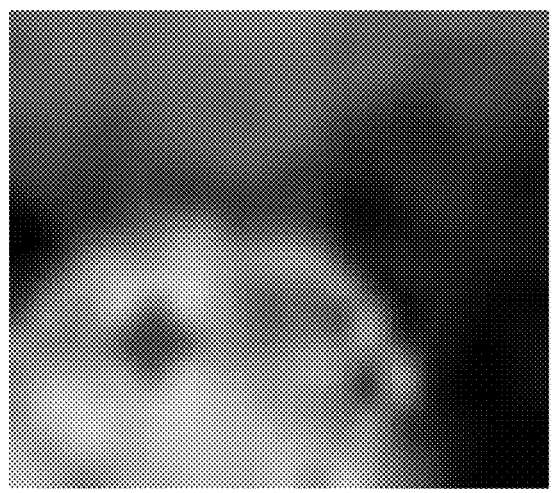

FIG. 3 shows a case where the amount of pollen collected by bees is numerically expressed when it exceeds a certain criterion and is relatively sufficient (or heavy), and FIG. 4 represents the corresponding pollen image at that moment, displayed in a distinct bright color with clear boundaries.

Figure 5:
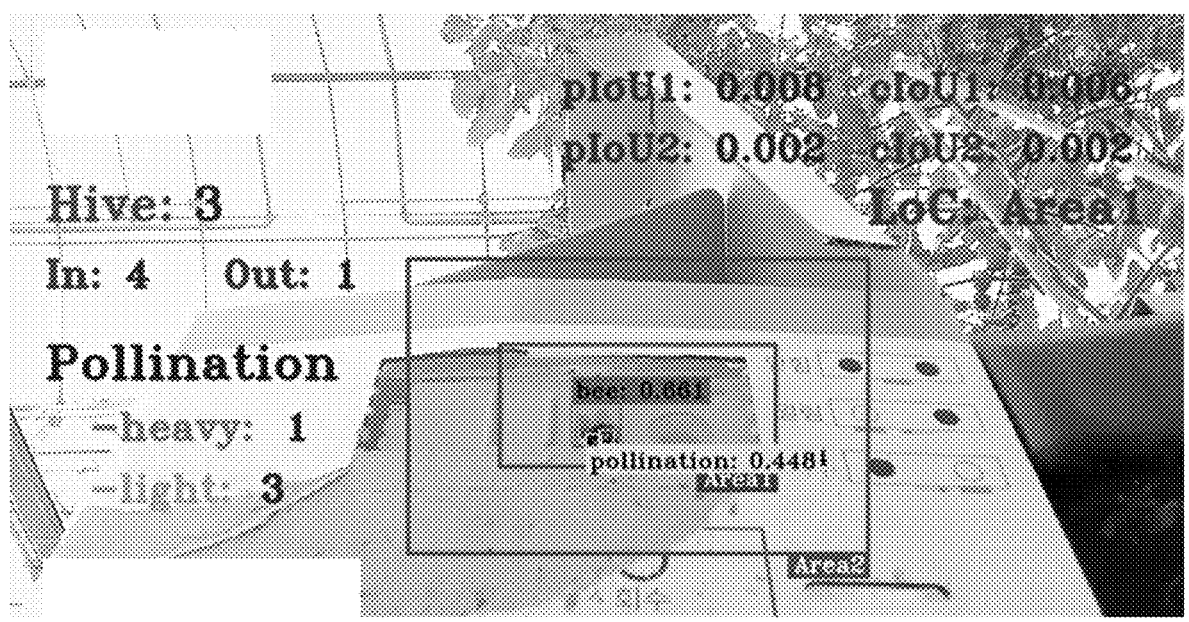
Figure 6:

FIG. 5 represents the amount of pollen collected by bees when it is below a certain criterion and is relatively insufficient (or light), and FIG. 6 represents the corresponding pollen image at that moment, displayed in a relatively faint or dark color with blurred boundaries, dispersed across multiple regions, or distributed over a wide area.

FIGS. 7 to 11 shows screenshots of the videos tracking the trajectory of bees entering the beehive.

Figure 7:
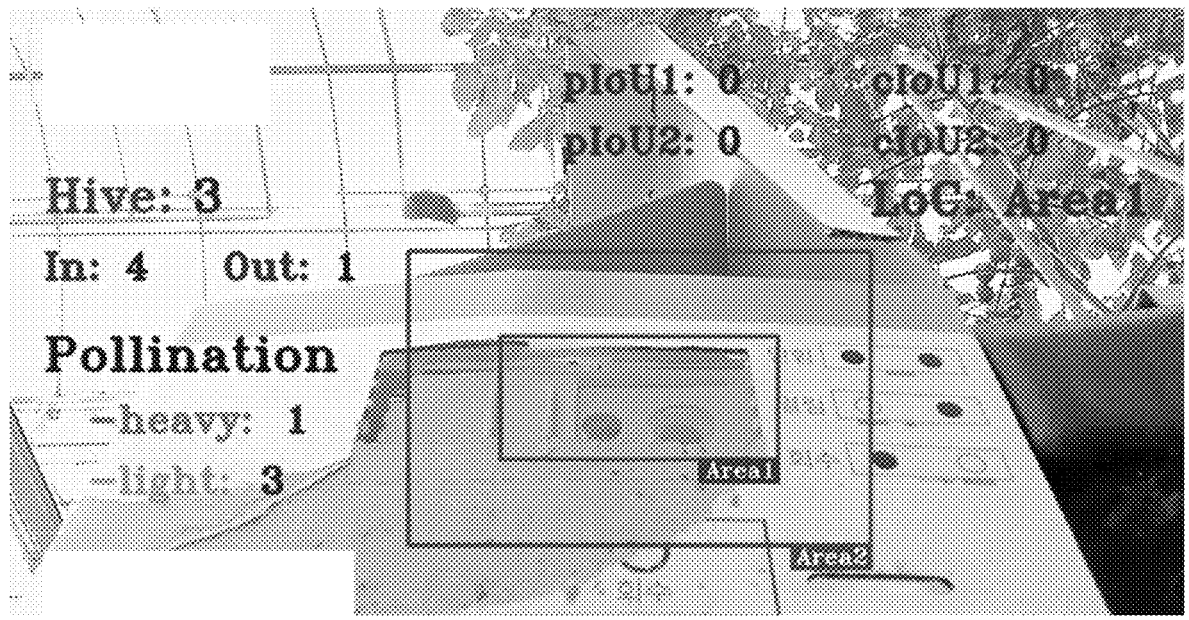

In FIG. 7, since the start of recording, it can be observed that four bees entered the beehive (In: 4), one bee came out of the beehive (Out: 1), and there are currently three bees inside the beehive (Hive: 3). Moreover, among the four bees that entered the beehive, one case indicates a heavy amount of pollen collection (Pollination-heavy: 1), and three cases indicate a light amount of pollen collection (Pollination-light: 3).

Furthermore, in the previous and current frames, no movement of bees is detected in all areas (pIoU1, cIoU1, pIoU2, cIoU2='0'). Although the image shows a bee in the top left corner of gate 2, the apparatus has not yet recognized it as a bee.

Figure 8:
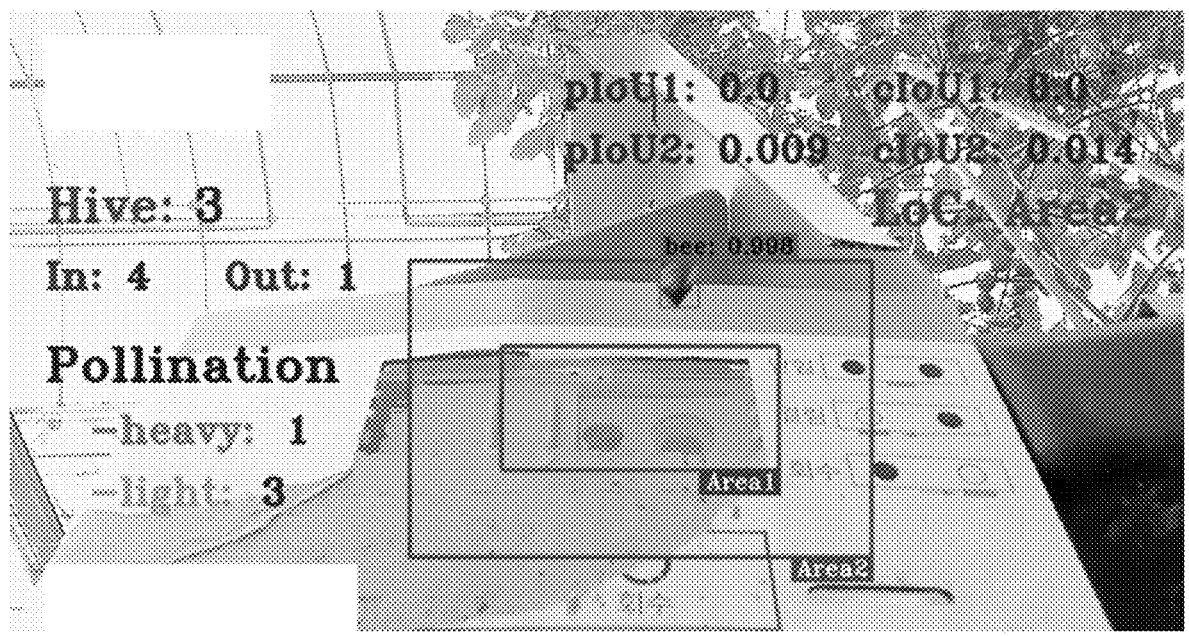
Figure 9:
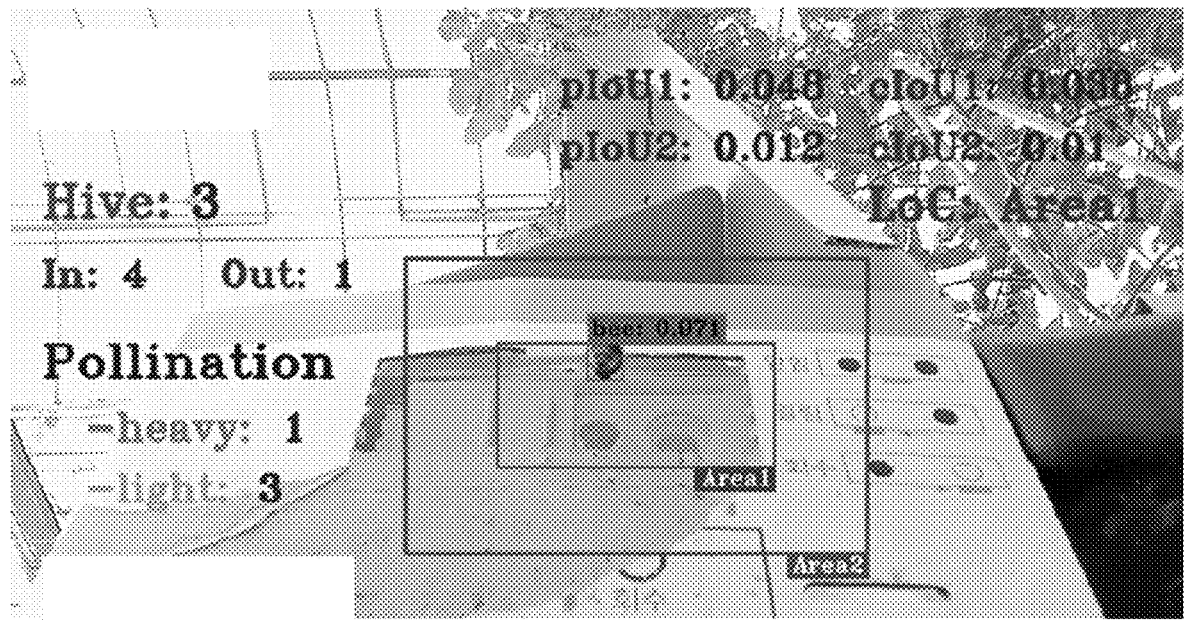
Figure 10:
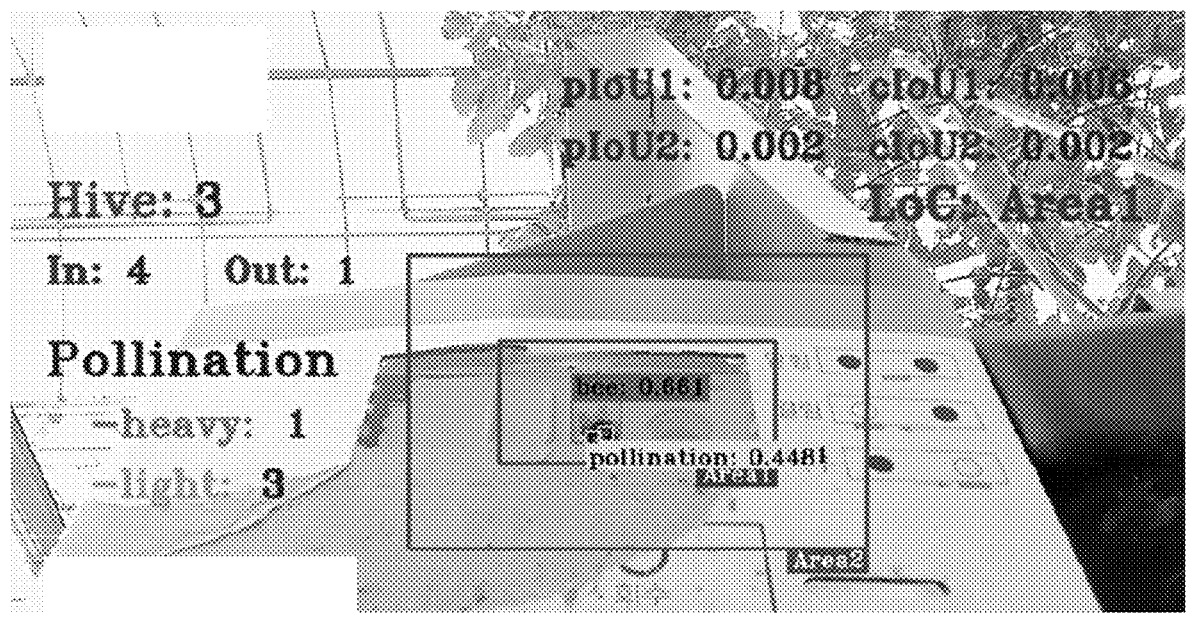
Figure 11:
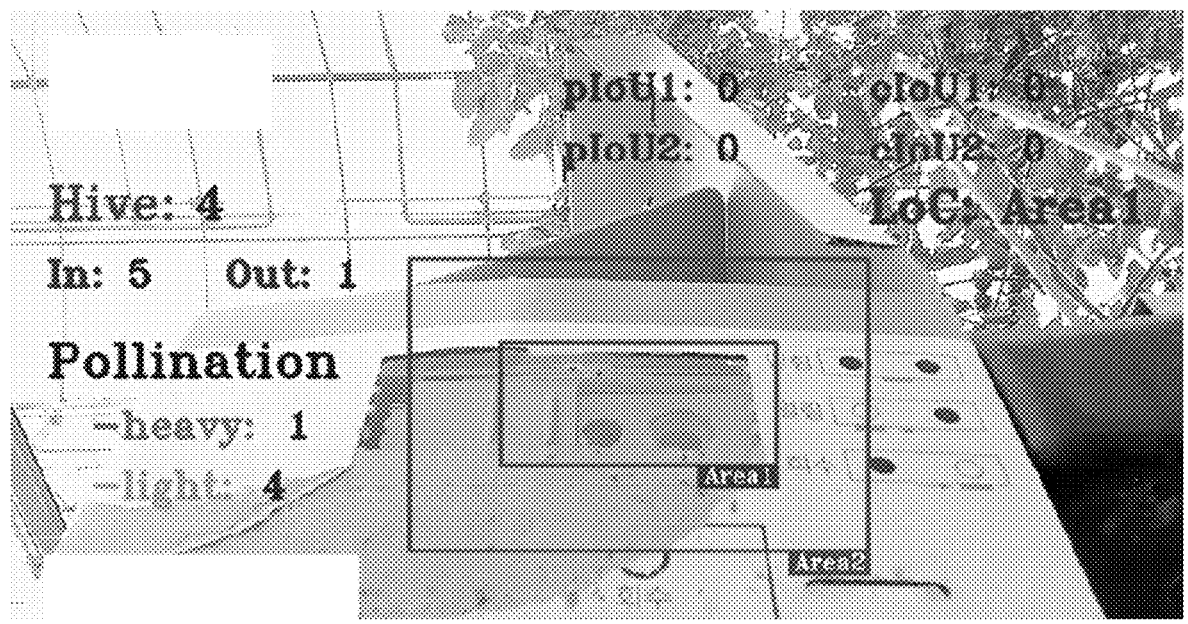

In FIG. 8, as the IoU value in Area 2 increases from pIoU2: 0.009 to cIoU: 0.014, indicating the bee's entry into Area 2, and in FIG. 9, as the bee enters Area 1, the IoU value indicating the intersection with the bee box in Area 1 changes from pIoU1: 0.048 to cIoU: 0.036. In FIG. 10, as the bee enters the entrance, both IoU1 and IoU2 values decrease. In FIG. 11, the bee completely enters the hive, disappearing from the frame (IoU1=IoU2='0'), and the 'Hive' value increases to '4', indicating the bee's presence inside the hive, and the 'Pollination-light' value increases to '4' based on the amount of pollen collected by the bee.

Figure 12:
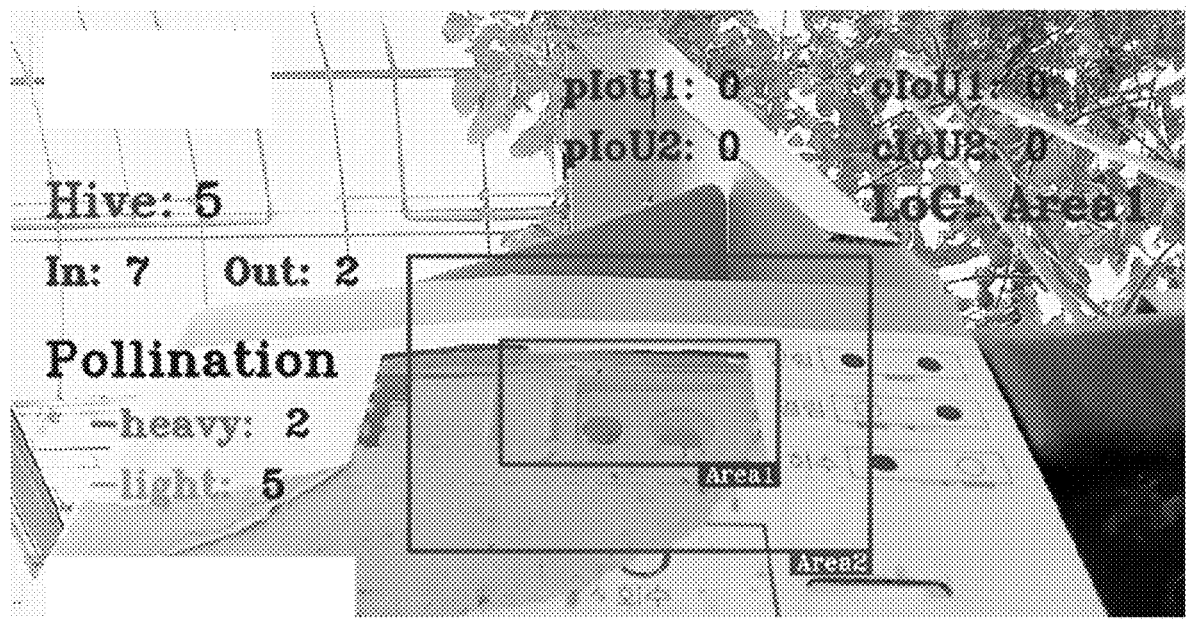

Furthermore, FIGS. 12 to 15 capture the trajectory of bees leaving the hive. FIG. 12 shows a later time frame, which shows the state after two bees entered the beehive and one bee came out, in comparison to the frame of FIG. 11. The pollen load of one bee is classified as 'heavy' while the other bee is classified as 'light.'

Figure 13:
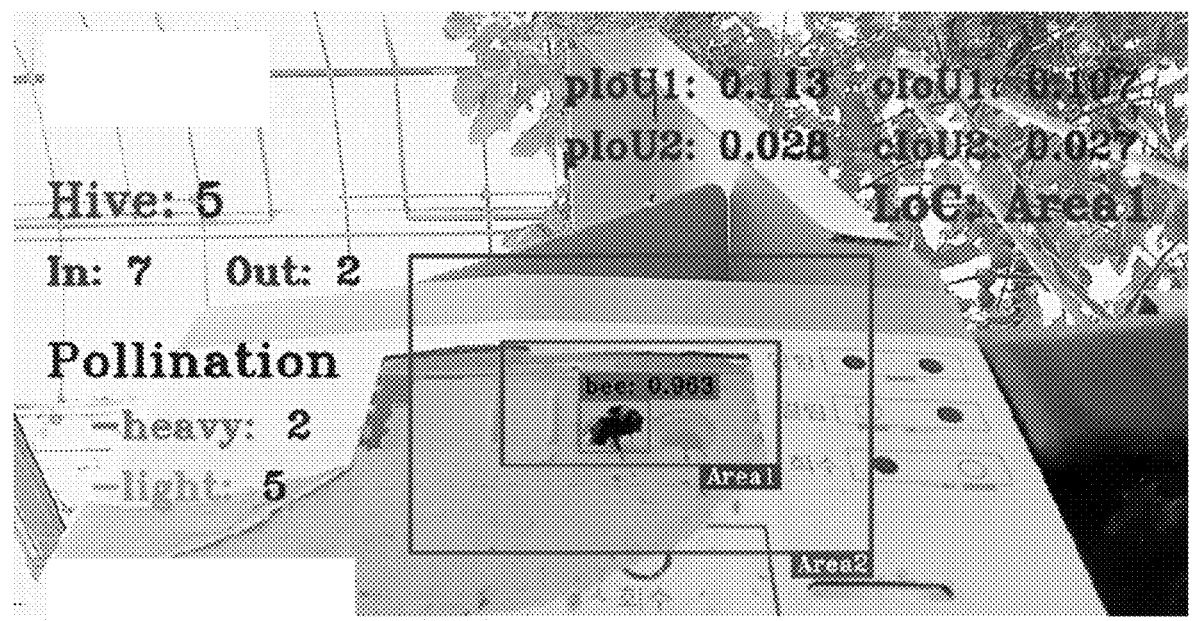
Figure 14:
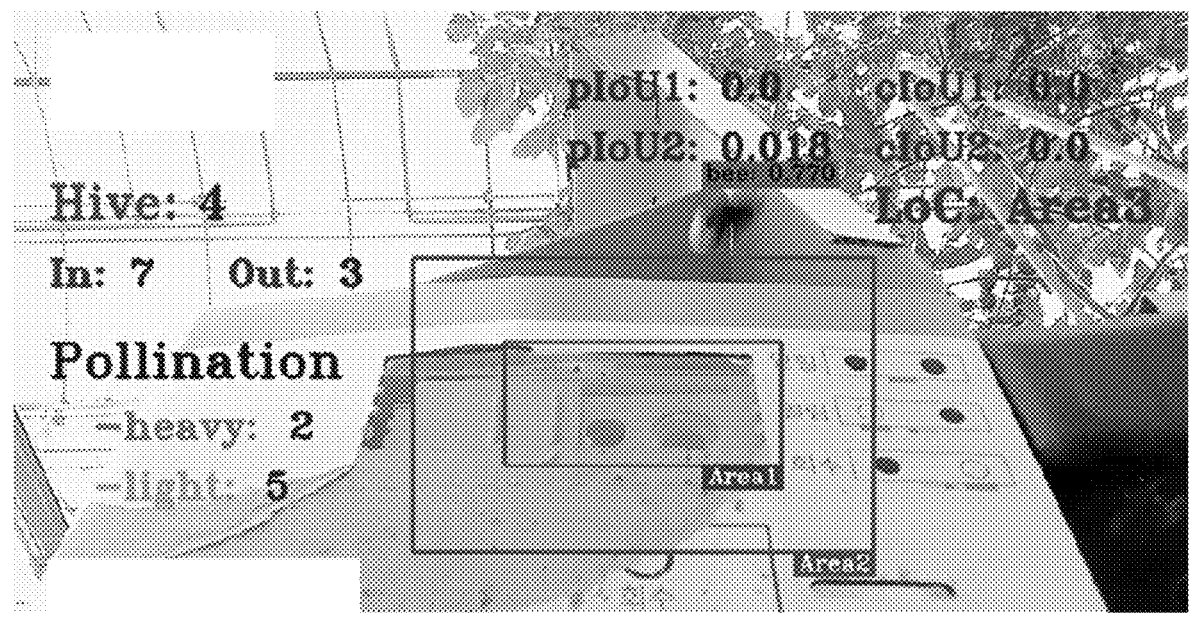

In FIG. 13, the exit of a bee from the beehive is captured, resulting in an increase in IoU values in both Area 1 and Area 2. In FIG. 14, as the bee moves from Area 2 to Area 3, there is no change in IoU value in Area 1, but the IoU value in Area 2 decreases from pIoU: 0.018 to cIoU: 0.0. This is considered the bee's exit from the beehive, leading to a decrease in the 'Hive' value to '4' and an increase in the 'Out' value to '3'.

Figure 15:
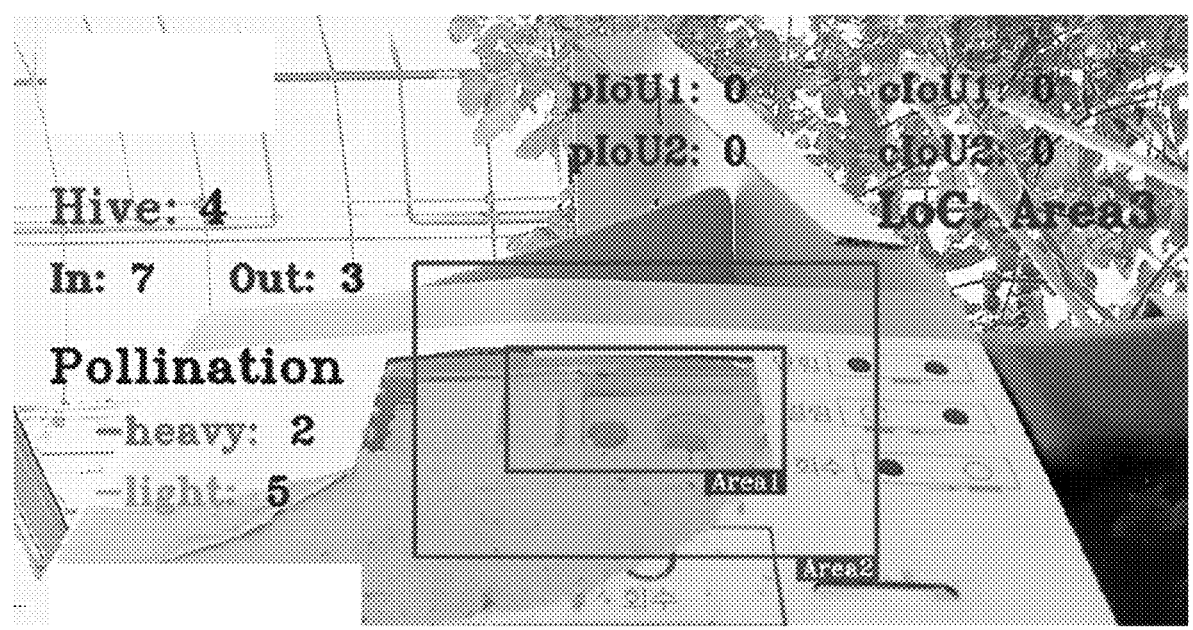

Finally, in FIG. 15, where the bee completely disappears from the frame, all IoU values remain '0', and other values show no change.

However, using only the intersection calculation of IoU to determine the trajectory of bees can be challenging in cases where object recognition is limited due to insufficient training data or when the object suddenly disappears from the frame.

To address this, after using an algorithm to find the initial trajectory by cross-analyzing the previous frame's intersections (pIoU1, pIoU2) with the current frame's intersections (cIoU1, cIoU2), it is necessary to interpolate the distance traveled using interpolation methods. In other words, when there is insufficient training data for the object or when the training images are of poor quality (e.g., blurry images used for training), a method of predicting the bee's location using interpolation is applied to account for situations where the bee's presence is uncertain.

Figure 16:
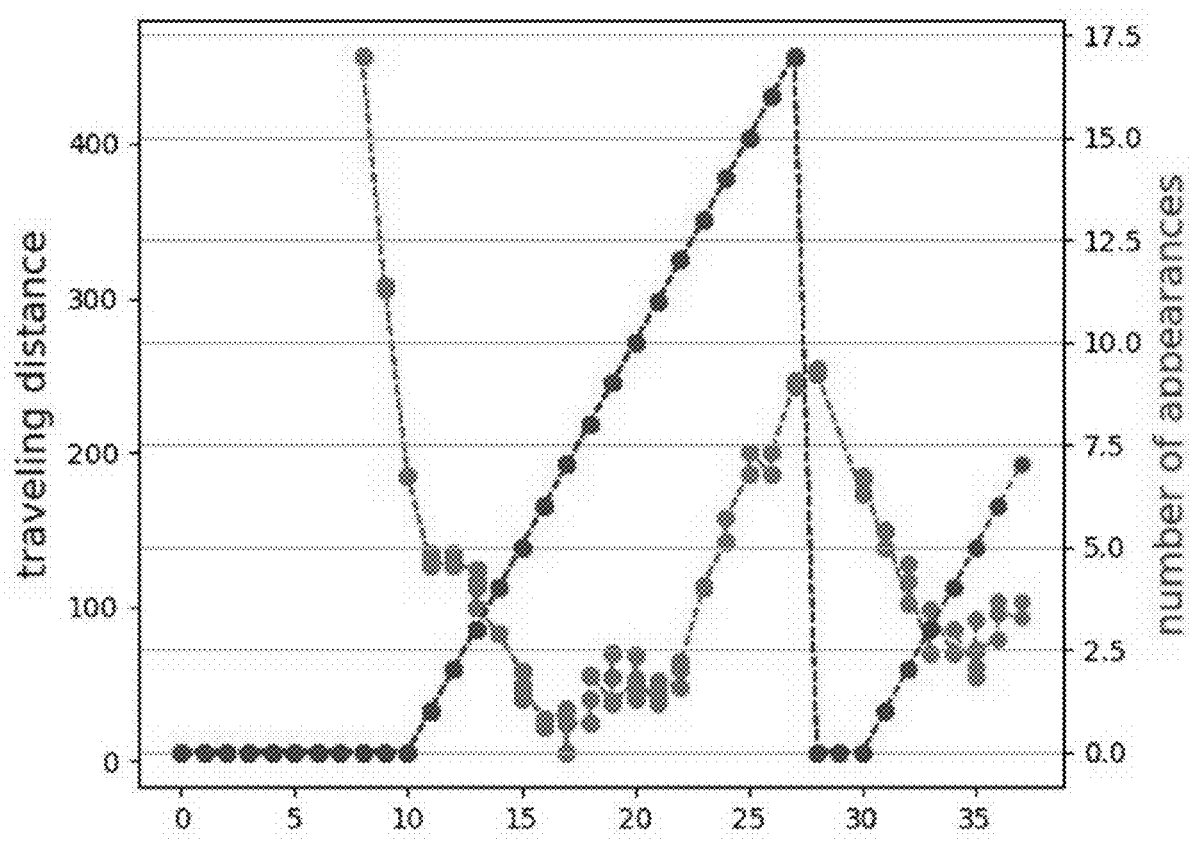
FIG. 16 is an analyzing diagram illustrating the bee's traveling distance and appearance frequency in the apparatus for tracking and analyzing the trajectory of bees according to some embodiment of the present invention.

The apparatus of the present invention can analyze the above-mentioned video frames and generate a trajectory chart of bee movements, as shown in FIG. 16.

FIG. 16 is an analyzing diagram illustrating the bee's traveling distance and appearance frequency in the apparatus for tracking and analyzing the trajectory of bees according to some embodiment of the present invention.

FIG. 16 is a trajectory chart showing the bee's traveling distance and appearance frequency. The chart allows us to understand bees' movements and status by combining the trajectory line (blue), representing the traveling distance from the beehive's entrance to the bee box, and the appearance frequency line (red), representing the frequency of the bee box's appearance.

Figure 17:
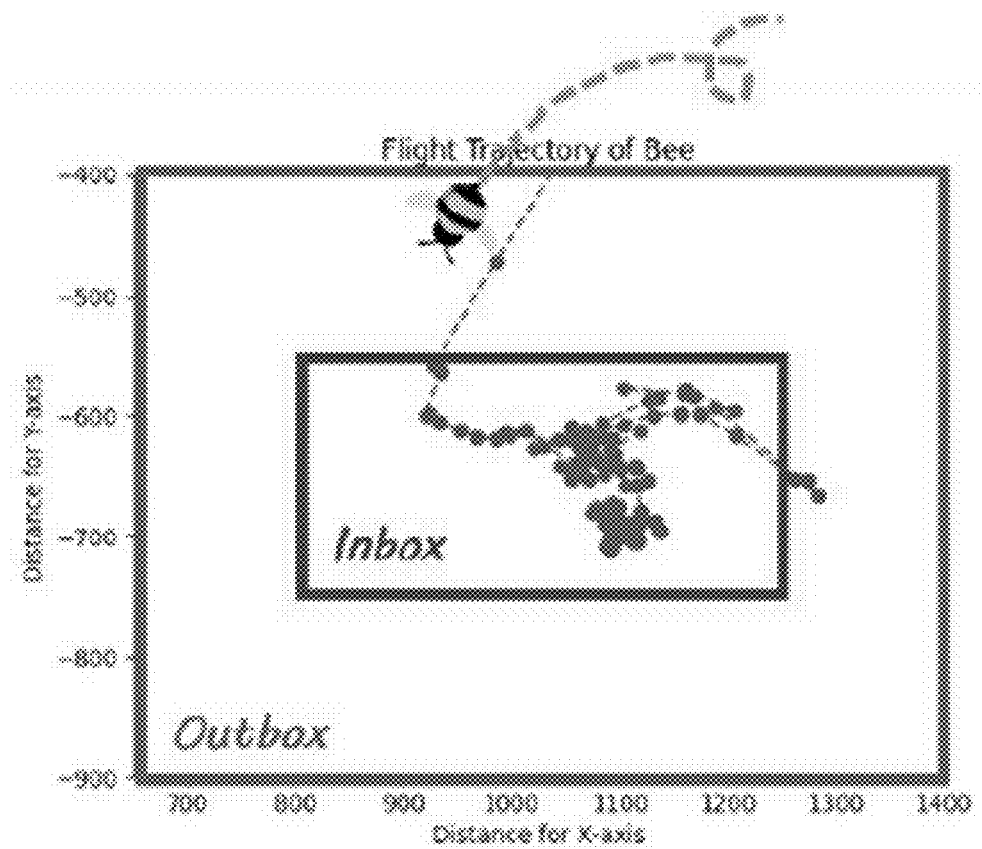
FIGS. 17 to 19 are exemplary diagrams showing the trajectory tracking using the apparatus for tracking and analyzing the trajectory of bees according to some embodiment of the present invention.
Figure 18:
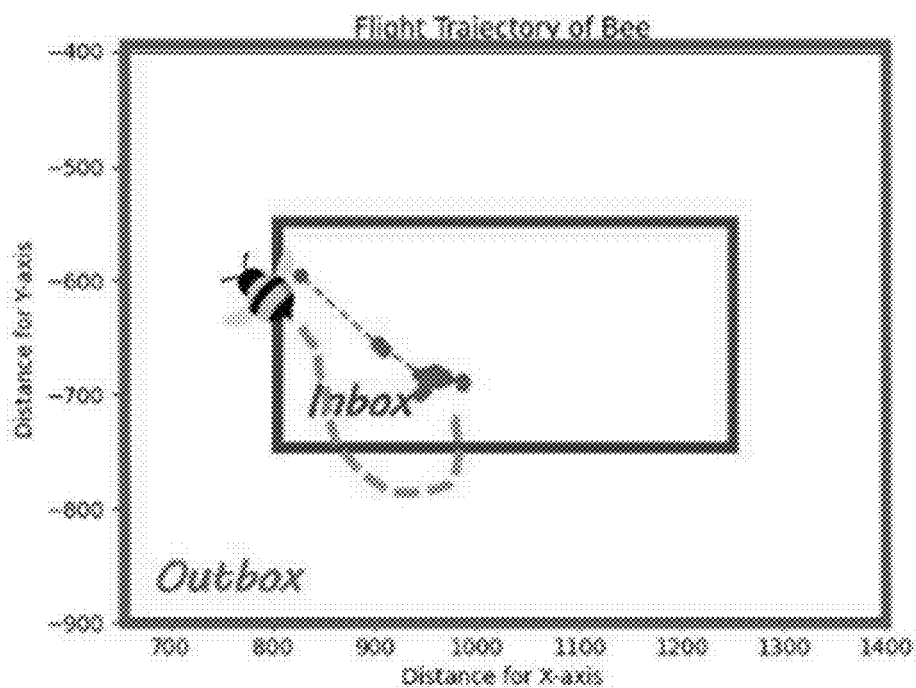
Figure 19:
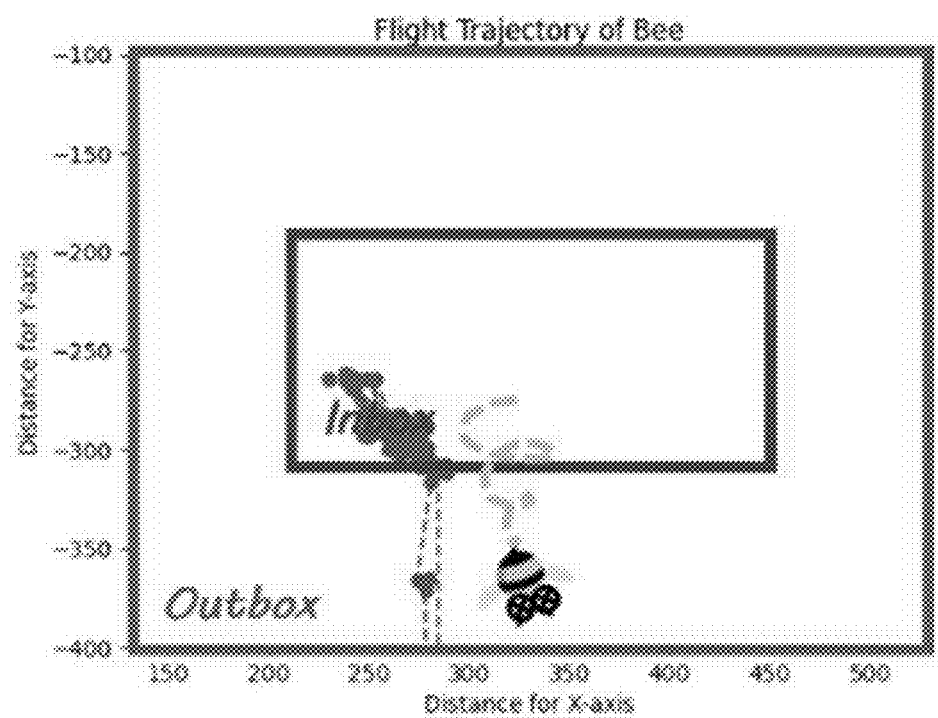

FIGS. 17 to 19 are exemplary diagrams showing the trajectory tracking using the apparatus for tracking and analyzing the trajectory of bees according to some embodiment of the present invention.

For example, FIG. 17 represents a normal bee's trajectory entering the beehive, while FIG. 18 represents a normal bee's trajectory leaving the beehive. In contrast, FIG. 19 depicts a bee that terminates its movement in the vicinity of the beehive entrance, indicating a case where the bee falls and dies.

FIGS. 20 to 23 are exemplary diagrams showing the bee state analysis using the apparatus for tracking and analyzing the trajectory of bees according to some embodiment of the present invention.

The apparatus of the present invention can provide various forms of bee status analysis. For instance, the example shown in FIG. 20 includes a graph depicting the bee's flight trajectory in the X-Y coordinate system ("Flight Trajectory of Bee") and a graph indicating the cumulative appearance frequency of the bee within the video ("Observation of Bee's Staying"). Similarly, the examples in FIGS. 21 to 23 consist of graphs showing the bee's traveling distance from a reference point ("Traveling Distance of Bee") and the bee's appearance status graph.

Figure 20:
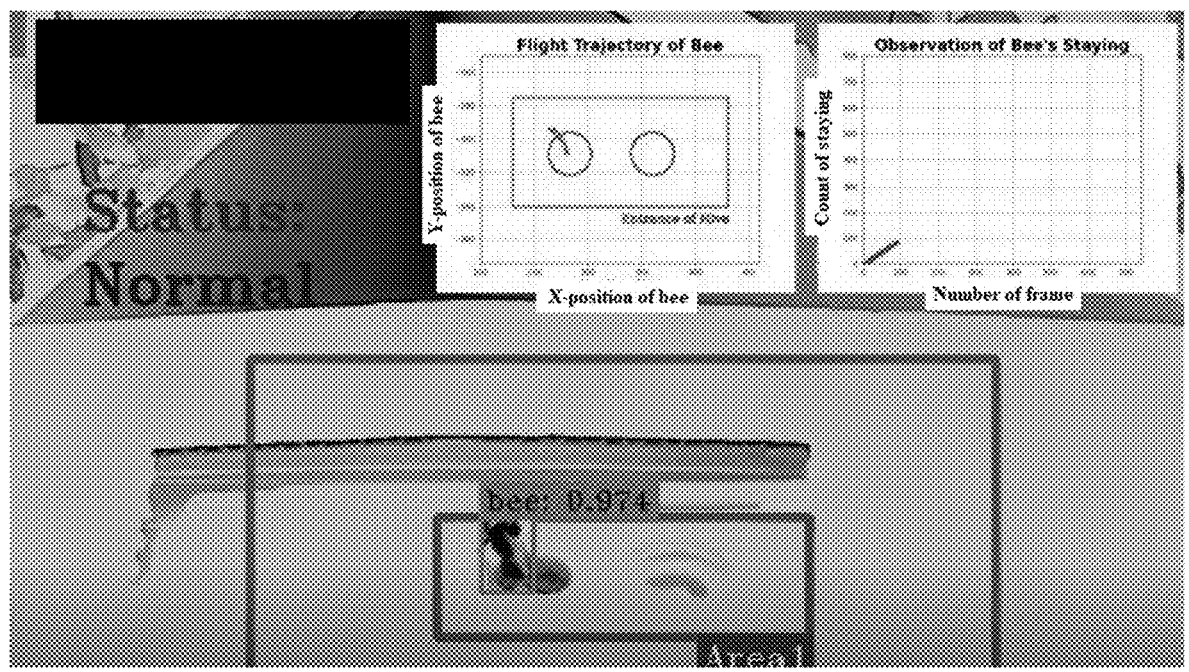
FIGS. 20 to 23 are exemplary diagrams showing the bee state analysis using the apparatus for tracking and analyzing the trajectory of bees according to some embodiment of the present invention.
Figure 21:
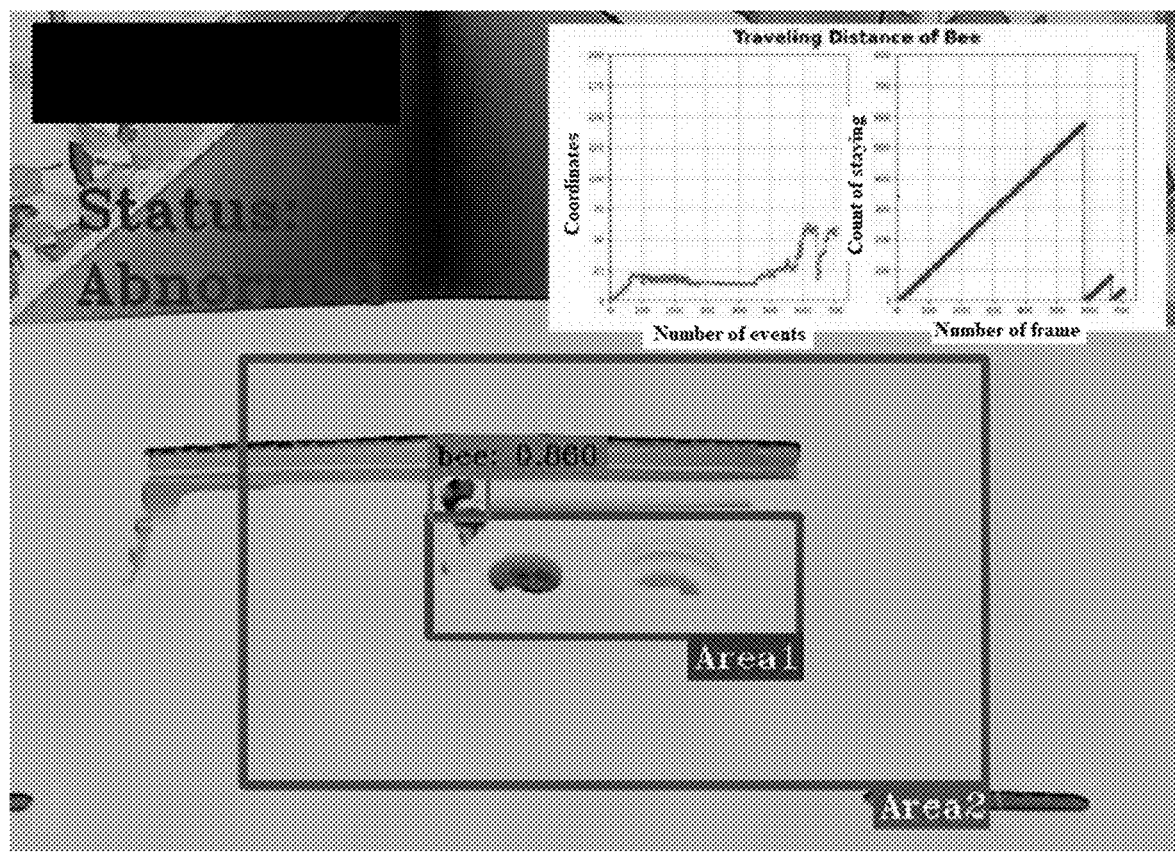
Figure 22:
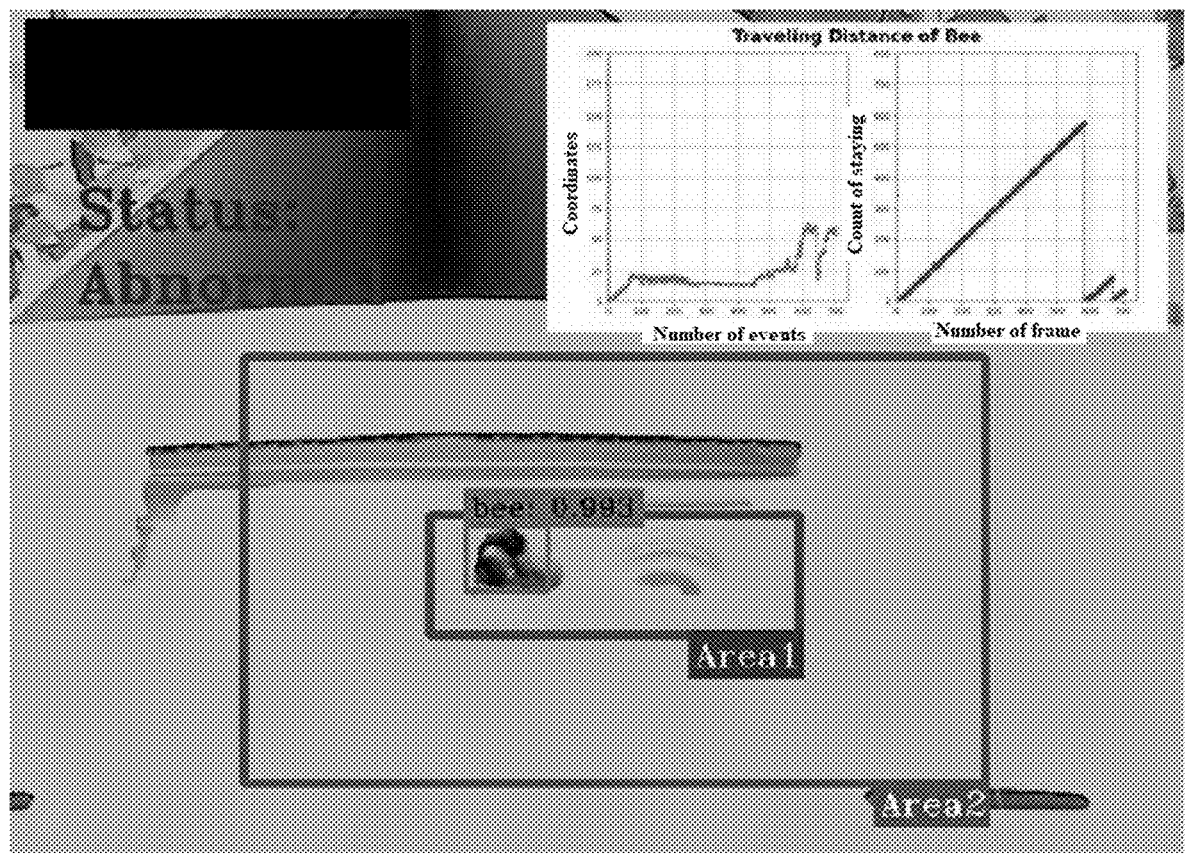
Figure 23:
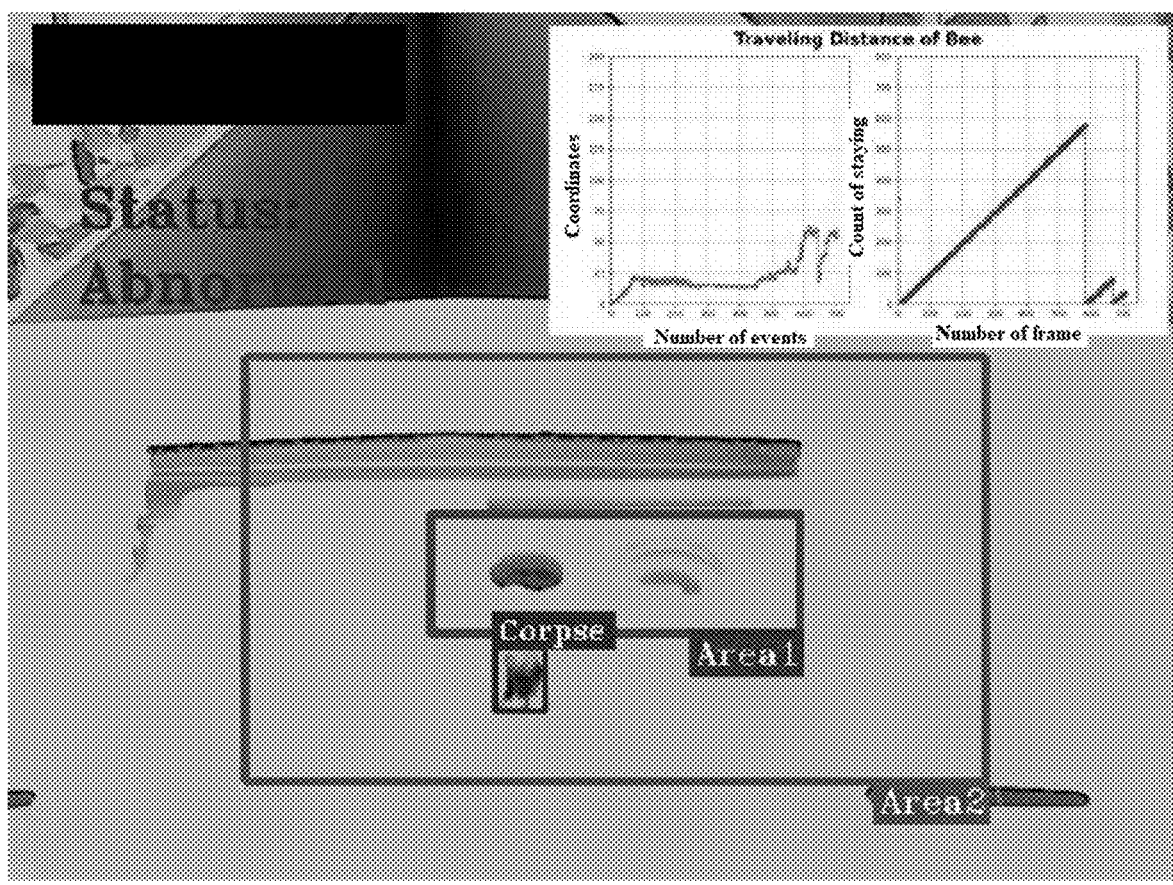

FIG. 20 provides insights into the movement of a normal bee leaving the hive through the beehive entrance. FIGS. 21 to 23 reveal the movement of an abnormal bee that wanders around the vicinity of the beehive and eventually falls and dies.

FIGS. 21 and 22 display trajectories where the bees continuously patrol around the entrance without increasing or decreasing the distance from the reference point. This shows a traveling distance having a flat pattern for a certain period. On the other hand, such movements can also occur when observing healthy bees with newly installed hives, as they require time to adapt to their new environment. In such cases, they are considered in a "Normal" state.

Based on the observations, it is noted that normal bees typically enter the beehive within approximately one second and take even less time to exit. However, as time passes after the initial beehive installation, the entry/exit time gradually increases, indicating a decrease in activity due to the aging and energy consumption of bees.

When capturing videos at a frame rate of 30 frames per second, it is considered normal if the tracked bee's entry trajectory is within 100 steps (Note: the step threshold can be arbitrarily set and learned through the initialization program). If it exceeds 200 steps, it is considered problematic, and if it exceeds 300 steps, it indicates the need for beehive replacement.

Furthermore, the apparatus of the present invention can utilize pre-trained data to detect the approach of abnormal objects. For example, by training the characteristics (size, pattern, movement) of intruders that harm bumble bees (e.g., wasps or mites), the apparatus can automatically detect and alarm their presence through video analysis.

Moreover, the apparatus of the present invention can learn (or train) and analyze data such as the shape and color of pollen, normal and abnormal bee movements, etc. Thus, it can distinguish the color of pollen in captured videos to determine if bees are visiting the intended types of plants or other types of plants. It can also assess whether bee movements are normal or abnormal. This information can provide insights into environmental changes, the suitability of bee foraging activities, or assist in beehive and greenhouse management.

The embodiments and specific details described above are provided to facilitate a better understanding of the present invention. However, the present invention is not limited to these embodiments and can be subject to various modifications and variations by those skilled in the art based on their ordinary knowledge in the technical field to which the present invention belongs.

Therefore, the scope of the present invention should not be limited to the described embodiments but should encompass all modifications and variations that are within the scope of the principles disclosed in this specification.

The invention claimed is:

1. An apparatus for tracking and analyzing trajectory of bees through learning comprising:
a camera unit configured to capture movement of bees near an entrance of a beehive;
a storage unit configured to store trained data obtained by training physical characteristics of bees using a deep learning model; and
a control unit configured to track the trajectory of bees using a captured video from the camera unit and the stored trained data,
wherein the control unit is configured to define multiple virtual areas of different sizes centered around the entrance of the beehive and define bee boxes around the bees when the bees are identified in the captured video, and
wherein the virtual areas include Area 1, which occupies a certain area around the entrance of the beehive, and Area 2, which includes the Area 1 and occupies a larger area than the Area 1.

2. The apparatus of claim 1, wherein the trained data further includes data on morphological characteristics of pollen, and the control unit is configured to analyze quantity of pollen using pollen images captured in the video and the morphological characteristics of pollen included in the trained data.

3. The apparatus of claim 1, wherein the control unit distinguishes entry and exit of bees by recording or tracking an order in which the bee boxes overlap with the virtual areas.

4. The apparatus of claim 1, wherein the control unit is configured to calculate a relative distance change from a center point of the entrance of the beehive to the bee boxes and a frequency of appearance of the bee boxes within the virtual areas.

5. The apparatus of claim 1, wherein the control unit is configured to distinguish bees entering the beehive from bees leaving the beehive by comparing the trajectory of bees captured within the virtual areas with a trajectory data of bees included in the trained data.

6. The apparatus of claim 1, wherein the control unit is configured to distinguish normal bees from abnormal bees by comparing the trajectory of bees captured within the virtual areas with a trajectory data of bees included in the trained data.

7. The apparatus of claim 6, wherein the control unit is configured to determine a replacement time of the beehive by calculating a ratio or number of the normal bees and the abnormal bees.

8. The apparatus of claim 1, wherein the control unit is configured to accumulate a number of bees captured within the virtual areas on a frame-by-frame basis.

9. The apparatus of claim 1, wherein the control unit is configured to calculate the trajectory of bees around the entrance of the beehive based on X-axis distance and Y-axis distance from the entrance of the beehive.

10. The apparatus of claim 1, wherein the control unit is configured to determine bees as leaving the beehive if an overlap between the bee boxes and the virtual areas occurs in an order from the Area 1 to the Area 2 during a specified period and determine bees as entering the beehive if the overlap occurs in an order from the Area 2 to the Area 1.

11. The apparatus of claim 1, further comprising a display unit, wherein the control unit is configured to count a number of bees entering or leaving the beehive at the entrance of the beehive and display it on the display unit.

12. The apparatus of claim 11, wherein the control unit is configured to display quantity of pollen on the display unit.

13. The apparatus of claim 12, wherein the control unit is configured to display color of pollen on the display unit.

14. The apparatus of claim 1, wherein the trained data further includes data on morphological characteristics of abnormal objects, and the control unit is configured to analyze a presence of the abnormal objects using the captured video of the abnormal objects and the morphological characteristics of the abnormal objects included in the trained data.

15. The apparatus of claim 1, wherein the control unit is configured to predict a position of bees using interpolation in areas of the captured video where bees are not identified.

16. An apparatus for tracking and analyzing trajectory of bees through learning, comprising:
a camera unit configured to capture movement of bees near an entrance of a beehive;
a storage unit configured to store trained data obtained by training physical characteristics of bees using a deep learning model; and
a control unit configured to track the trajectory of bees using a captured video from the camera unit and the stored trained data,
wherein the control unit is configured to define bee boxes around the bees when the bees are identified in the captured video,
wherein the control unit is configured to define pollen boxes around identified pollen in the captured video, and
wherein the pollen boxes are defined within the bee boxes.

17. The apparatus of claim 16, wherein the control unit is configured to form contours on boundaries of a distribution area of pollen by image preprocessing to find the distribution area of pollen within the pollen boxes and calculate color and concentration of pollen in an internal area of the contours.

* * * * *